US009540171B2

(12) United States Patent
Elazary et al.

(10) Patent No.: US 9,540,171 B2
(45) Date of Patent: Jan. 10, 2017

(54) AUTONOMOUS ORDER FULFILLMENT AND INVENTORY CONTROL ROBOTS

(71) Applicant: inVia Robotics, LLC, Agoura Hills, CA (US)

(72) Inventors: Lior Elazary, Agoura Hills, CA (US); Daniel Frank Parks, II, Los Angeles, CA (US); Randolph Charles Voorhies, Culver City, CA (US)

(73) Assignee: inVia Robotics, Inc., Agoura Hills, CA (US)

( * ) Notice: Subject to any disclaimer, the term of this patent is extended or adjusted under 35 U.S.C. 154(b) by 6 days.

(21) Appl. No.: 14/838,081

(22) Filed: Aug. 27, 2015

(65) Prior Publication Data
US 2016/0304280 A1 Oct. 20, 2016

Related U.S. Application Data

(63) Continuation of application No. 14/688,903, filed on Apr. 16, 2015, now Pat. No. 9,120,622.

(51) Int. Cl.
G06F 7/00 (2006.01)
B65G 1/137 (2006.01)
(Continued)

(52) U.S. Cl.
CPC ............. *B65G 1/1373* (2013.01); *B25J 5/007* (2013.01); *B25J 9/1697* (2013.01); *B25J 15/0028* (2013.01); *B25J 15/06* (2013.01); *B25J 15/0608* (2013.01); *B25J 15/0616* (2013.01); *B25J 19/04* (2013.01); *B65G 1/0492* (2013.01); *G06Q 10/087* (2013.01); *G06Q 30/0633* (2013.01); *B65G 2209/10* (2013.01); *Y10S 901/01* (2013.01)

(58) Field of Classification Search
None
See application file for complete search history.

(56) References Cited

U.S. PATENT DOCUMENTS 3,750,804 A 8/1973 Lemelson
5,219,264 A 6/1993 McClure et al.
(Continued)

FOREIGN PATENT DOCUMENTS

WO WO9001683 A1 8/1989
WO WO2014011459 A1 1/2014

OTHER PUBLICATIONS

International Search Report and Written Opinion for PCT/US2016/19638, Jul. 26, 2016, 15 pages.

*Primary Examiner* — Yolanda Cumbess
(74) *Attorney, Agent, or Firm* — Los Angeles Patent Group; Arman Katiraei

(57) ABSTRACT

Some embodiments provide a system for fully autonomous order fulfillment and inventory management within a distribution site or warehouse. The system operates by autonomous robots directly pulling customer order items from distribution site shelves or pulling individual bins from distribution site shelves and dispensing appropriate quantities of items from the bins until all items of a customer order are retrieved without human involvement. The system further involves the robots autonomously monitoring item quantities within the distribution site, identifying and autonomously responding to shortages, and organizing the items within the distribution site for most efficient order fulfillment.

17 Claims, 14 Drawing Sheets

(51) Int. Cl.
*B25J 15/06* (2006.01)
*B25J 5/00* (2006.01)
*B25J 15/00* (2006.01)
*B65G 1/04* (2006.01)
*G06Q 10/08* (2012.01)
*B25J 9/16* (2006.01)
*B25J 19/04* (2006.01)
*G06Q 30/06* (2012.01)

(56) References Cited

U.S. PATENT DOCUMENTS

| | | | |
|---|---|---|---|
| 7,402,018 B2 | 7/2008 | Mountz et al. |
| 7,826,919 B2 | 11/2010 | D'Andrea et al. |
| 7,850,413 B2 | 12/2010 | Fontana |
| 7,873,469 B2 | 1/2011 | D'Andrea et al. |
| 7,894,932 B2 | 2/2011 | Mountz et al. |
| 7,894,933 B2 | 2/2011 | Mountz et al. |
| 7,912,574 B2 | 3/2011 | Wurman et al. |
| 7,920,962 B2 | 4/2011 | D'Andrea et al. |
| 8,068,978 B2 | 11/2011 | D'Andrea et al. |
| 8,170,711 B2 | 5/2012 | D'Andrea et al. |
| 8,220,710 B2 | 7/2012 | Hoffman et al. |
| 8,239,291 B2 | 8/2012 | Hoffman et al. |
| 8,265,873 B2 | 9/2012 | D'Andrea et al. |
| 8,280,546 B2 | 10/2012 | D'Andrea et al. |
| 8,280,547 B2 | 10/2012 | D'Andrea et al. |
| 8,892,258 B2 | 11/2014 | Jacobsen et al. |
| 8,928,481 B2 | 1/2015 | Abe |
| 2008/0077511 A1* | 3/2008 | Zimmerman | G06Q 10/00 705/28 |
| 2011/0238205 A1 | 9/2011 | Kemp et al. |
| 2012/0176491 A1 | 7/2012 | Garin et al. |
| 2014/0222191 A1 | 8/2014 | Blumenau |
| 2014/0343713 A1* | 11/2014 | Ziegler | B65G 1/137 700/214 |
| 2015/0032252 A1* | 1/2015 | Galluzzo | B25J 5/007 700/218 |

\* cited by examiner

AUTONOMOUS ORDER FULFILLMENT AND INVENTORY CONTROL ROBOTS

CLAIM OF BENEFIT TO RELATED APPLICATIONS

This application is a continuation of U.S. nonprovisional application Ser. No. 14/688,903 entitled "Autonomous Order Fulfillment and Inventory Control Robots", filed Apr. 16, 2015. The contents of application Ser. No. 14/688,903 are hereby incorporated by reference.

BACKGROUND INFORMATION

Robots are becoming increasingly sophisticated with regards to the complexity of the tasks they can perform. The increased sophistication results from improved robot functionality as well as improved automation that leverages the functionality to implement more complex tasks. As a result, robots can better assist humans by supplementing humans in certain capacities and replacing humans in other capacities more suited or more efficient for the robot to perform.

One particular area where robotic automation is used with greater sophistication and functionality is in order fulfillment and inventory control. Large retailers, warehouse operators, or distributors, like Amazon.com®, rely on robots to assist human workers in fulfilling orders.

Such retailers, warehouse operators, or distributors house their inventory in one or more distribution sites. FIG. 1 conceptually illustrates a distribution site. The distribution site is typically a large enclosed space with shelves 120 located throughout the space. The shelves can be several feet or stories high with several rows or racks. On each row or rack are several bins 130 that store quantities of the same item. In some cases, the items are stacked directly on the shelf rows or racks without the bins.

With partial robotic automation, rather than have a human worker traverse the warehouse in order to locate each item of a customer order, robots perform the retrieval operation for the human, thereby freeing the human to focus on fulfilling and ensuring correctness of the order. Specifically, the warehouse management/control system (WMS/WCS) receives the order and identifies a location within the distribution site where a human will fulfill the order. The order, along with the human's position for that order, are passed to one or more robots. The robots navigate the distribution site to locate the shelves where each order item is located. The robots lift the shelves containing one or more items of the customer order and deliver those shelves to the human's position. The human then sorts through each delivered shelf to obtain the one or more order items contained within the shelf. The human scans the obtained items and enters the obtained items into a customer order box to fulfill the order one item at a time. The human dismisses each robot when there are no more items left to pull for the customer order from the shelf delivered by the robot. Consequently, the robot returns the shelf to its previous location within the distribution site. The next robot then delivers the next shelf containing additional customer order items. This continues until the human has fulfilled the entire order.

By delivering the shelves containing the ordered items to the human location rather than have the human go to the individual shelf locations, the humans, and in turn, overall order fulfillment, become more efficient. However, such automation systems, in many cases, require a complete overhaul of the distribution site. The overhaul involves replacing the shelving with specialized shelving that the robots can lift and move within the distribution site. A more efficient system uses existing shelving, and works alongside existing manual labor, in order to allow distribution site operators to scale automation gradually until eventually all human involvement from order fulfillment and inventory management is eliminated.

Another shortcoming of prior art systems that prevents full automation is the limited functionality of prior art robots. Robots of the prior art are limited to moving only along an x-y spatial plane. This allows them to retrieve the shelves for the human, but prevents them from accessing the shelf rows and retrieving individual items from the shelves. To promote further automation, there is a need to enable intelligent robotic movement along a z spatial plane in addition to movements along the x and y spatial planes.

BRIEF DESCRIPTION OF THE DRAWINGS

A preferred embodiment of methods and systems for autonomous order fulfillment and inventory control robots will now be described, by way of example only, with reference to the accompanying drawings in which.

DETAILED DESCRIPTION OF PREFERRED EMBODIMENTS

The embodiments disclose a system for fully autonomous order fulfillment and inventory management within a distribution site or warehouse. In some embodiments, fully autonomous order fulfillment involves robots directly pulling customer order items from distribution site shelves or pulling individual bins from distribution site shelves and dispensing appropriate quantities of items from the bins until all items of a customer order are retrieved without human involvement. In some embodiments, fully autonomous inventory management involves robots monitoring item quantities within the distribution site, autonomously restocking shelves in response to item shortages, and organizing the items within the distribution site for most efficient order fulfillment.

The system primarily involves a control center, one or more robots, and, optionally, bins. The control center configures the robots with the order fulfillment tasks, inventory management tasks, and distribution site optimization tasks that they are to perform either individually or collectively. Each robot is configured with an array of sensors and actuators that allow the robot to move within the distribution site along x, y, and z spatial planes. As with robots of the prior art, the movement about the x-y spatial planes allows the robots to navigate within the distribution site to identify shelves where customer order items are located. However, unlike the robots of the prior art, the movement about the z spatial plane by the robots set forth by the embodiments herein allows the robots to retrieve individual items or bins from the distribution site shelves and, optionally, dispense items of the customer order in order to better automate order fulfillment.

I. Robot

Figure 1:
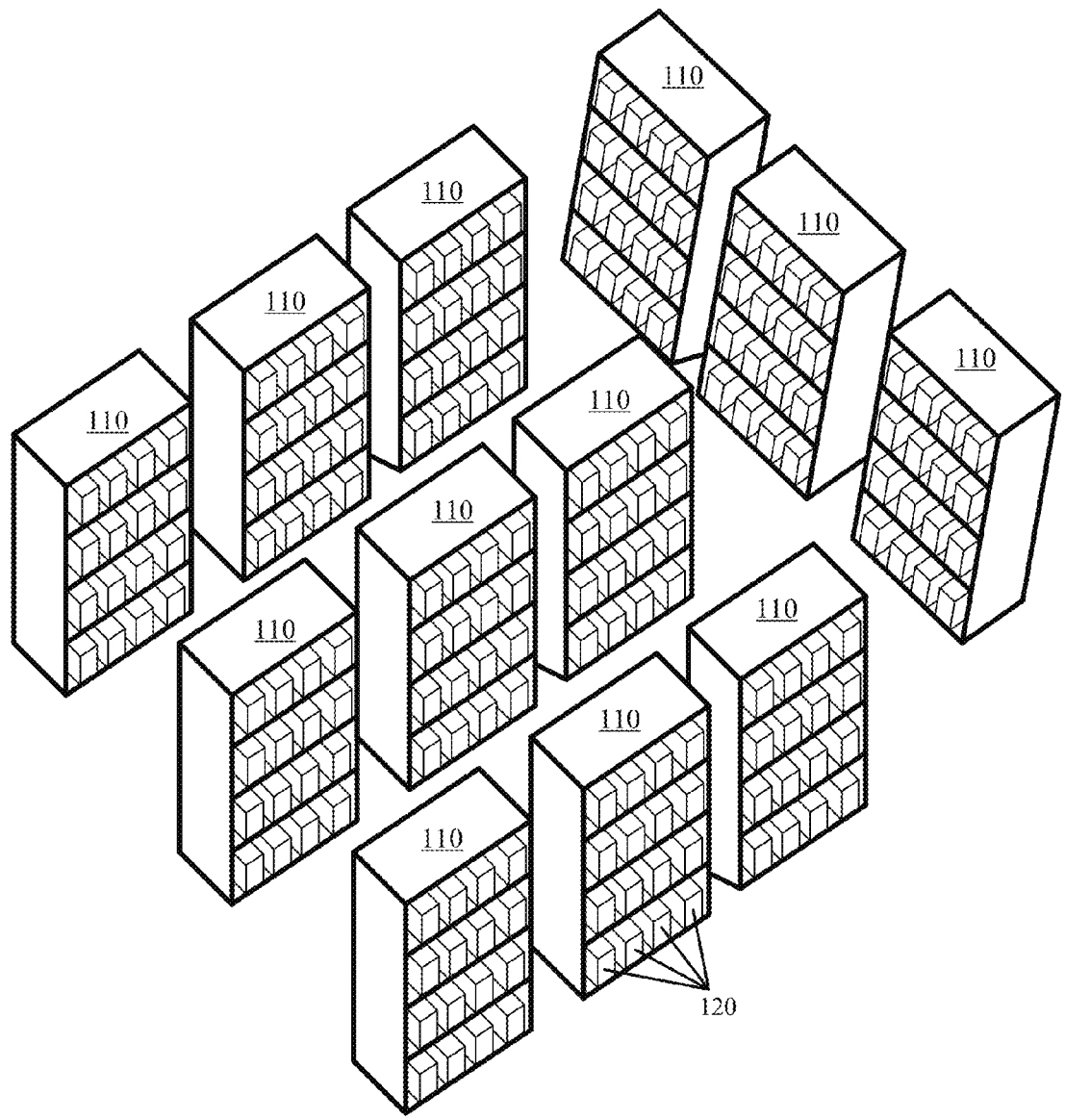
FIG. 1 conceptually illustrates a distribution site.
Figure 2:
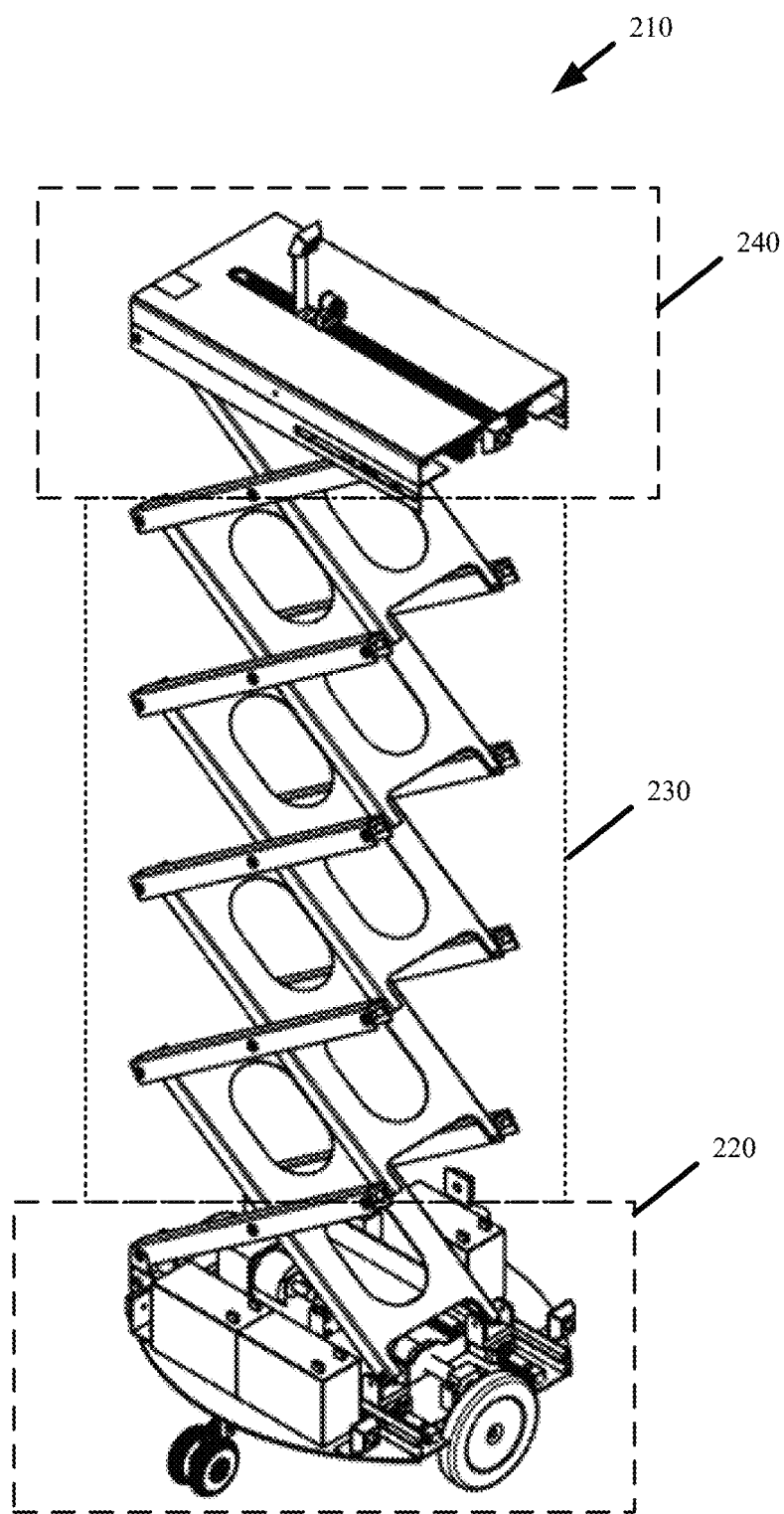
FIG. 2 illustrates a robot capable of performing fully autonomous order fulfillment, inventory management, and site optimization in accordance with some embodiments.

FIG. 2 illustrates a robot 210 capable of performing fully autonomous order fulfillment, inventory management, and site optimization in accordance with some embodiments. The robot 210 includes a motorized base 220, an extendible lift 230, and a retriever 240.

Figure 3:
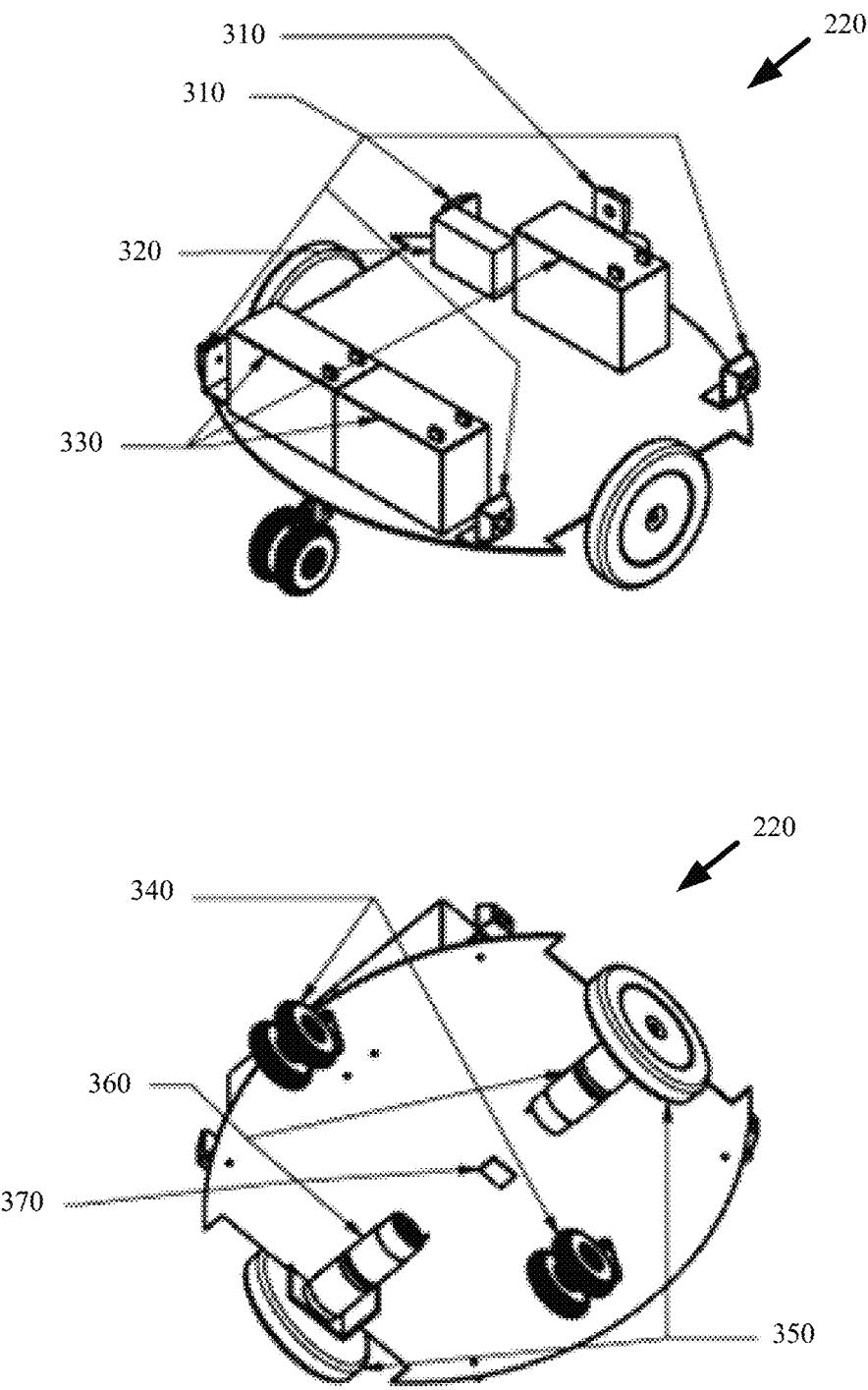
FIG. 3 provides a detailed view for the top and bottom of the motorized base in accordance with some embodiments.

FIG. 3 provides a detailed view for the top and bottom of the motorized base 220 in accordance with some embodiments. Atop the motorized base 220 are front and side cameras 310, a computer 320, and batteries 330.

The cameras 310 act as the eyes of the robot enabling the robot to determine its position within the distribution site, navigate within the distribution site while avoiding obstacles and collisions with other robots, and identify shelving containing customer order items. In some embodiments, the motorized base 220 is also equipped with a LIDAR system to assist in navigating the distribution site and avoiding obstacles. The LIDAR system emits lasers or light (e.g., ultraviolet, visible, or near infrared light) and analyzes the reflection to image the surrounding area and identify safe navigable pathways.

The computer 320 controls the robot's movements within the distribution site and in retrieval of bins or order items. The computer 320 includes a radio transceiver and receiver for communicating wirelessly with the control center and other robots. The computer 320 communicates with the control center in order to receive orders to fulfill and report back on order items that have been fulfilled. The computer 320 can also provide the control center with inventory updates such as the number of remaining items in a bin or shelf, or as to location of an item or bin within the distribution site. Robot-to-robot communication facilitates navigation as well as inventory management and distribution site optimization in some embodiments. The batteries 330 power the robot, allowing the robot to operate autonomously for several continuous hours.

Underneath the motorized base 220 are casters 340, drive wheels 350, and motors 360 that allow the robot to move along x-y spatial planes within the distribution site. An inertial measurement unit 370 is also provided to allow the computer 320 to sense various metrics including acceleration, vibration, tilt, orientation, magnetic field vector, rotational velocity, etc. The computer 320 is connected to the drive wheels 350, motors 360, and inertial measurement unit 370.

In some embodiments, the extendible lift 230 is coupled to motors at the base 220. In some other embodiments, the extendible lift 230 is coupled to a drive motor independent of the motors powering the robot wheels. The extendible lift 230 is a folding or collapsible framework that can expand to lift the robot retriever 240 to any of several heights. When fully collapsed, the extendible lift 230 rises about one foot above the motorized base in some embodiments. When fully expanded, the extendible lift 230 rises over six feet above the motorized based in some embodiments. In some embodiments, the reachable height of the extendible lift 230 varies depending on the robot application and the distribution site in which it is deployed. Thus, for distribution sites with shorter shelving, the robots can be configured with a smaller extendible lift 230 and for distribution sites with taller shelving, the robots can be configured with a larger extensible lift that can rise to greater heights. The robot motor can set the extendible lift 230 to any position between the fully collapsed position and the fully extended position of the extendible lift 230. In some embodiments, the motor is a screw drive motor. In some other embodiments, the motor powers the extendible lift 230 pneumatically or with other mechanical means. The robot computer 320 controls the extendible lift 230 motor and, in conjunction with cameras located on the retriever 240, can rise or lower the extendible lift 230 to be aligned with any shelf row, bin, or item.

Figure 4:
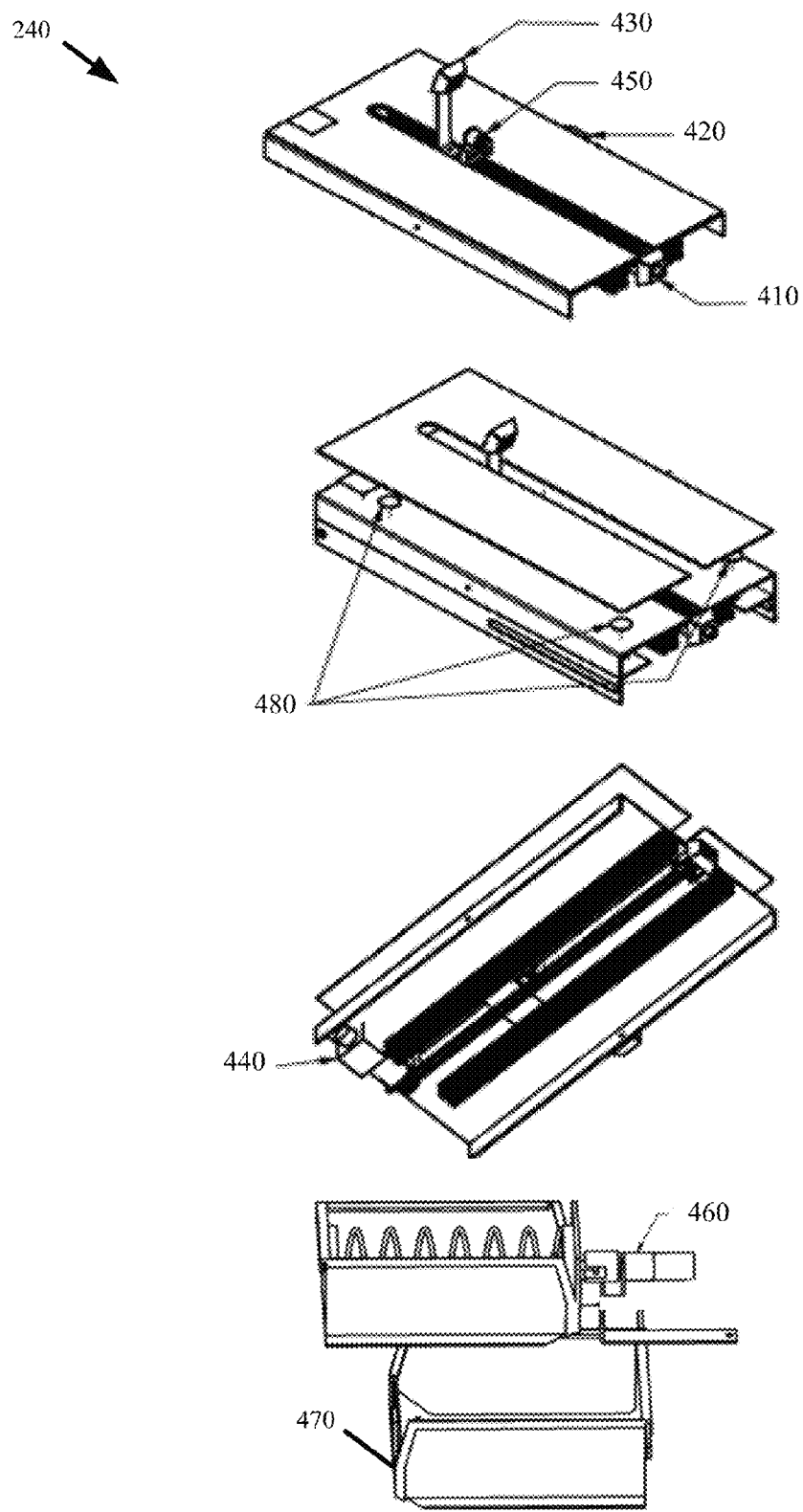
FIG. 4 different views for the robot retriever of some embodiments.

The retriever 240 sits atop the extendible lift 230 and is the means with which the robot identifies and pulls items or bins from the shelves, and optionally, dispenses individual items from the bins. The retriever 240 can have different embodiments. Two such embodiments will be explained with reference to FIG. 4. FIG. 4 provides different views for the robot retriever 240 of some embodiments.

In a first embodiment, the retriever 240 is a platform comprising a set of cameras 410, 420, and 430, a pull motor 440 that is connected to and moves a suction assembly 450, an item deposit bin 470, and a set of load cells 480. In some embodiments, the set of cameras 410-430 include an underneath camera 410, forward upper camera 420, and overhead bin camera 430. The computer 320 at the base is communicably coupled to and can control operation of each of the retriever 240 elements.

To retrieve an item directly from a shelf onto which one or more items are stacked, the robot positions itself in front of the shelf. Using the set of cameras 410-430, the robot scans the shelf in order to find an item identified by a particular identifier. The particular identifier can be a Universal Product Code (UPC), other product code, serial number, or item feature that can be used to uniquely identify different items on a shelf. The robot then adjusts its x, y, and z spatial positions so that the retriever 240 is directly aligned with the target item. Once aligned, the robot activates the pull motor 440 to extend the suction assembly 450 towards the target item until contact is made. In some embodiments, the suction assembly 450 sits atop a track with movement of the suction assembly 450 along the track being controlled by the pull motor 440. In some other embodiments, the pull motor 440 is a pneumatic cylinder that is coupled at one end to the suction assembly 450. The pull motor 440 can extend or retract the pneumatic cylinder, thereby moving the suction assembly 450 about the retriever 240 platform.

In some embodiments, the suction assembly 450 is comprised of a suction cup. When the suction cup is pressed against an item, it adheres to that item with suction, thereby allowing the item to be retrieved from its stationary position. In some other embodiments, the suction assembly 450 is comprised of a suction cup and a motor that is coupled to the suction cup. The motor creates a vacuum to provide better suction for the suction cup to adhere to the target item.

Once the suction assembly 450 engages a target item, the pull motor 440 reverses and begins retracting the suction assembly 450 along with the target item engaged thereby. The pull motor 440 retracts the target item until it is aligned over the item deposit bin 470. Thereafter, the suction assembly 450 disengages the target item. In some such embodiments, the suction assembly motor stops the vacuum and optionally applies positive pressure, thereby causing the item to fall into the item deposit bin 470. Alternatively, the pull motor 440 can produce a movement (e.g., vertical shaking) that disengages the suction assembly 450 from the target item. The cameras 410, 420, 430 ensure that the item is properly deposited.

In a second embodiment of FIG. 4, the retriever 240 is used to retrieve bins from the shelves and to dispense items from the retrieved bins. In some such embodiments, the retriever 240 includes an electromagnet 450 connected to the pull motor 440 in place of the suction assembly. The retriever 240 may further include a dispensing motor 460. To facilitate the discussion with respect to the retriever 240 performing autonomous bin retrieval and autonomous order fulfillment by dispensing individual items from any retrieved bin, the bin structure is presented through the perspective, top, and front bin views of FIG. 5.

Figure 5:
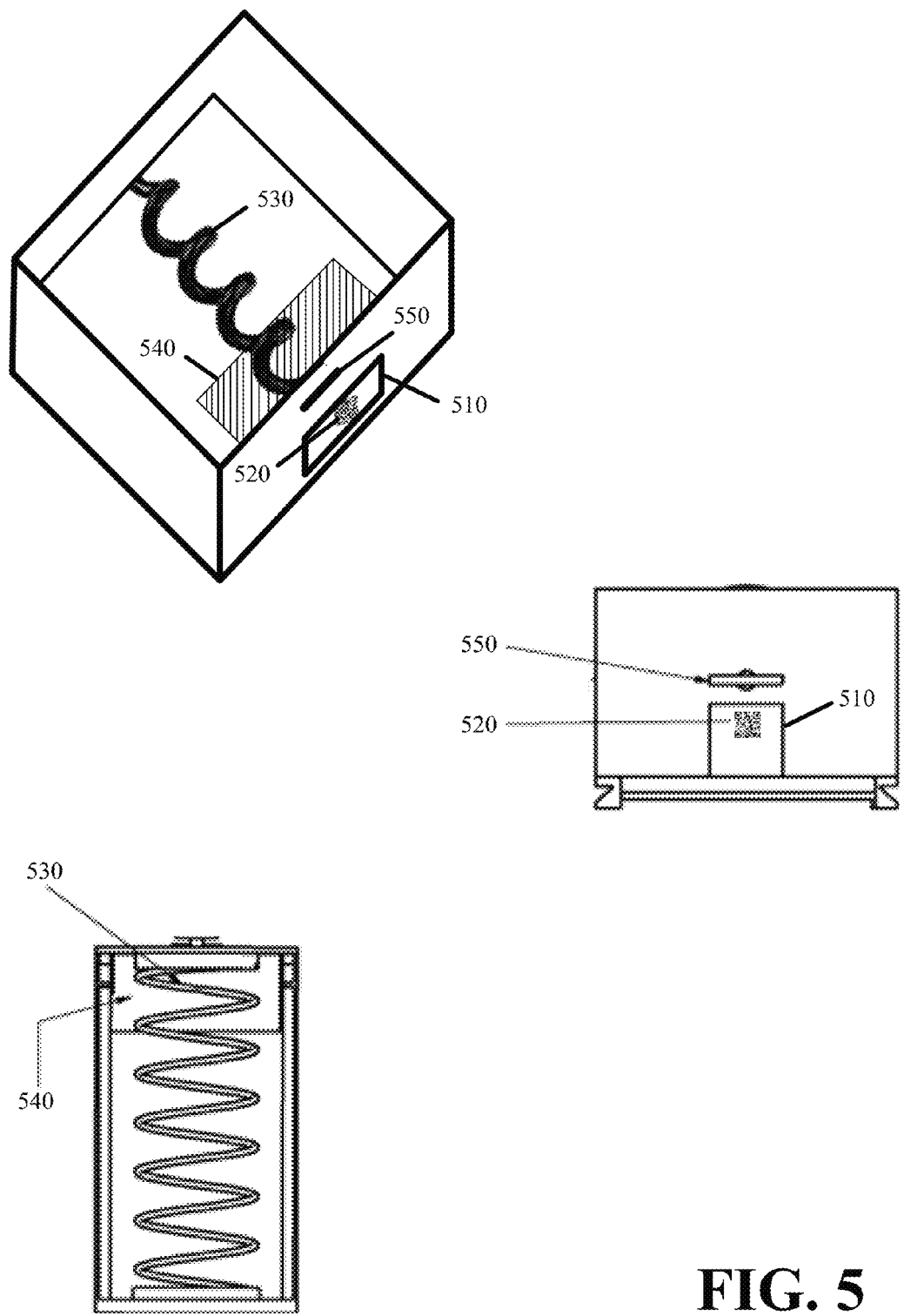
FIG. 5 presents perspective, top, and front views for the bin structure of some embodiments.

As shown in FIG. 5, the exterior side of the bin facing the robot contains a metal element 510 for magnetic coupling and decoupling by the robot retriever 240 electromagnet 450. Affixed over or adjacent to the metal element 510 is a unique bin identifier 520, such as a quick response (QR) code, bar code, radio frequency identification (RFID) tag, or feature uniquely identifying the items in the bin. The bin includes an inner body, a corkscrew 530 running the length of the inner body, and an aperture 540 about the front of the bin. The inner body stores one or more of the same item separated by spirals of the corkscrew 530. A connector 550 about the outer face of the bin is connected to the corkscrew 530 and allows for rotation of the corkscrew 530 from outside the bin. Like a vending machine, rotation of the corkscrew 530 brings the items positioned between the corkscrew 530 spirals closer to the bin front until they are over the bin aperture 540. Once an item is over the bin aperture 540, it falls from the bin through the aperture 540.

Figure 6:
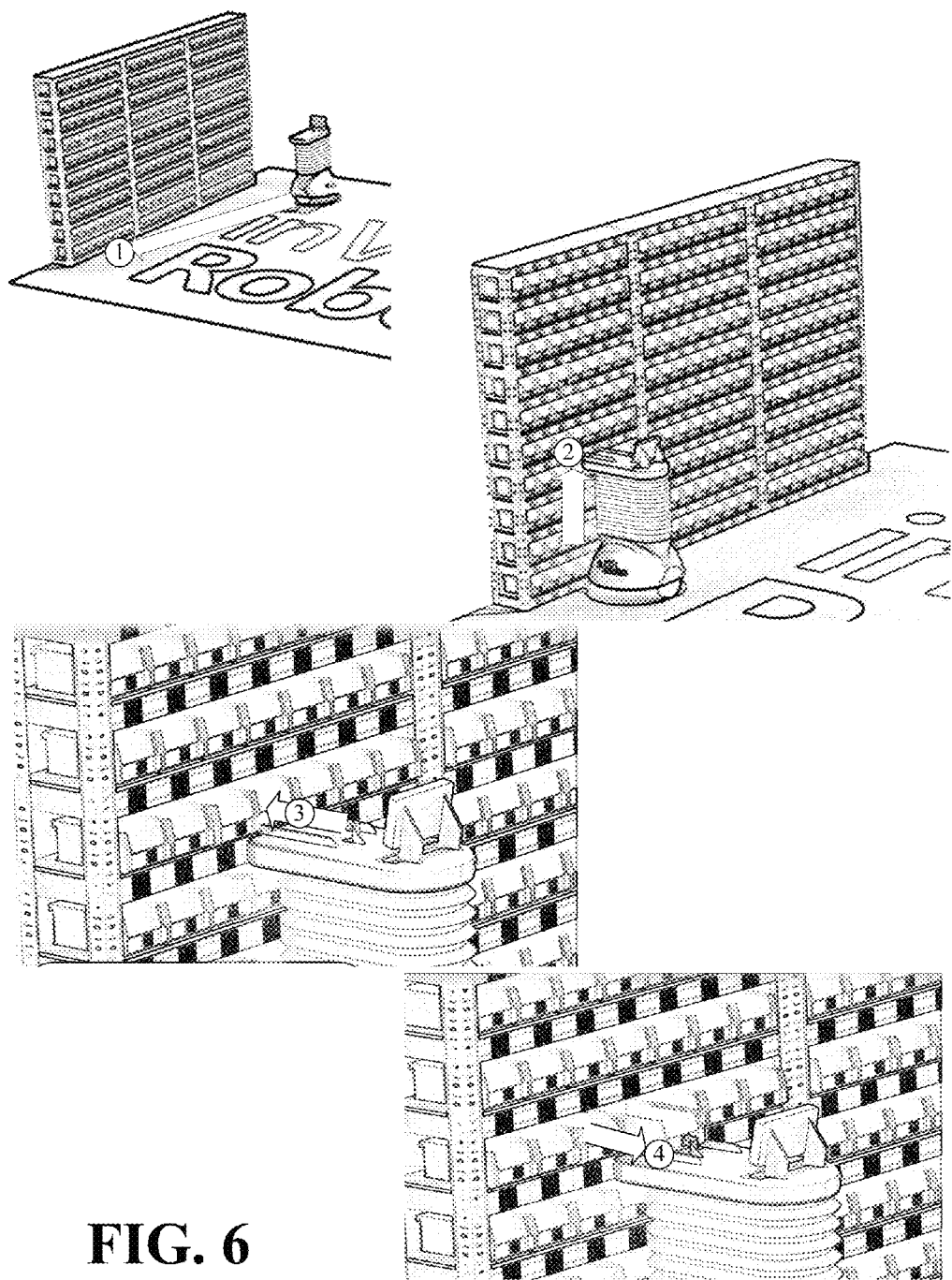
FIG. 6 a sequence of steps with which a robot of some embodiments identifies a specific target bin on a shelf and uses the suction assembly or electromagnet to retrieve the target bin directly from the shelf.

In some embodiments, the robot retriever 240 pulls bins, such as the one depicted in FIG. 5, from the distribution site shelves, dispenses items from the bins, and places the bins back on the shelves. To retrieve a bin, the robot positions itself in front of the shelf where the bin is located. Using the set of cameras 410-430 and the unique bin identifiers 520 about the bin face, the robot scans the shelf in order to find a bin identified by a particular identifier 520. The robot then adjusts its x, y, and z spatial positions so that the retriever 240 is directly aligned with the bin front facing metal element 510. Thereafter, the robot activates the pull motor 440 to extend the electromagnet 450 towards the target bin until the electromagnet 450 contacts the bin metal element 510 and the dispensing motor 460 is aligned with the bin corkscrew connector 550. The electromagnet 450 is activated. As a result, a magnetic force couples the electromagnet 450 to the bin. The pull motor 440 then reverses and begins retracting the electromagnet 450 which in turn pulls the bin that is magnetically coupled to the electromagnet 450. The pull motor 440 retracts the coupled bin until the bin aperture 540 is aligned over the item deposit bin 470. FIG. 6 a sequence of steps with which a robot of some embodiments identifies a specific target bin on a shelf and uses the suction assembly or electromagnet to retrieve the target bin directly from the shelf.

To dispense an item from a retrieved bin and fulfill part of a customer order, the robot activates the dispensing motor 460. In doing so, the dispensing motor 460 begins to rotate which causes the bin corkscrew connector 550 aligned with the dispensing motor 460 to also rotate until one item is dispensed from the bin into the item deposit bin 470. The item deposit bin 470 is a receptacle in which the robot carries any dispensed items retrieved by the robot. The retriever 240 underneath bin camera 410 detects the number of items dispensed from the bin. Once the number of dispensed items equals the number of items in the customer order, the retriever 240 halts the dispensing motor 460 rotation. The pull motor 440 then reverses to reposition the bin back along the shelf. The retriever 240 deactivates the electromagnet 450, thereby causing the electromagnet 450 to decouple from the bin. The pull motor 440 reverses once again in order to fully retract the electromagnet 450 and the retriever 240.

In some embodiments, the retriever 240 further includes a retractable extension. The retractable extension is a platform that extends and retracts from the retriever 240 towards a shelf positioned before the retriever 240. The retractable extension facilitates the retrieval of items or bins from the shelves. Specifically, in certain environments, the retriever 240 cannot sit flush against the shelf from which the retriever 240 is to retrieve a bin or item. Accordingly, the retractable extension is extended outwards to the shelf to bridge any gap between the retriever 240 and the shelf to ensure that a retracted bin or item does not fall through the gap. The retractable extension is also used in the retrieval of certain long bins or items. In such instances, the retractable extension provides additional support for any item or bin being retrieved.

In any retriever 240 embodiment, the set of load cells 480 facilitate autonomous inventory management by the robots. The set of load cells 480 measure the weight of anything placed atop the retriever. When the retriever 240 retrieves a bin, the set of load cells 480 measure the bin weight. From the bin weight and from knowing the weight of each item in the bin, the robot can track inventory by determining the quantity of items that are in a bin. Item weight can be predefined by the control center and sent to the robot. The robot can also determine item weight by weighing a bin, dispensing an item from the bin, weighing the bin once more after one item is dispensed from the bin, and noting the difference in weight before and after dispensing. The set of load cells 480 can also be used to verify that a customer order has been correctly fulfilled. In some embodiments, a robot is used to deliver a package containing all items of a customer order to a shipping drop off location within the distribution site. The package is placed atop the retriever 240 such that the set of load cells 480 can measure the weight of the entire package. Once again, by knowing the weight of the individual items of the customer order and comparing the aggregate weight of the package to the sum of the individual item weights, the robot can determine if all items are present or if there are any extraneous items in the package. Such verification is especially useful if the order is packaged or in any way involves human worker interaction.

Figure 7:
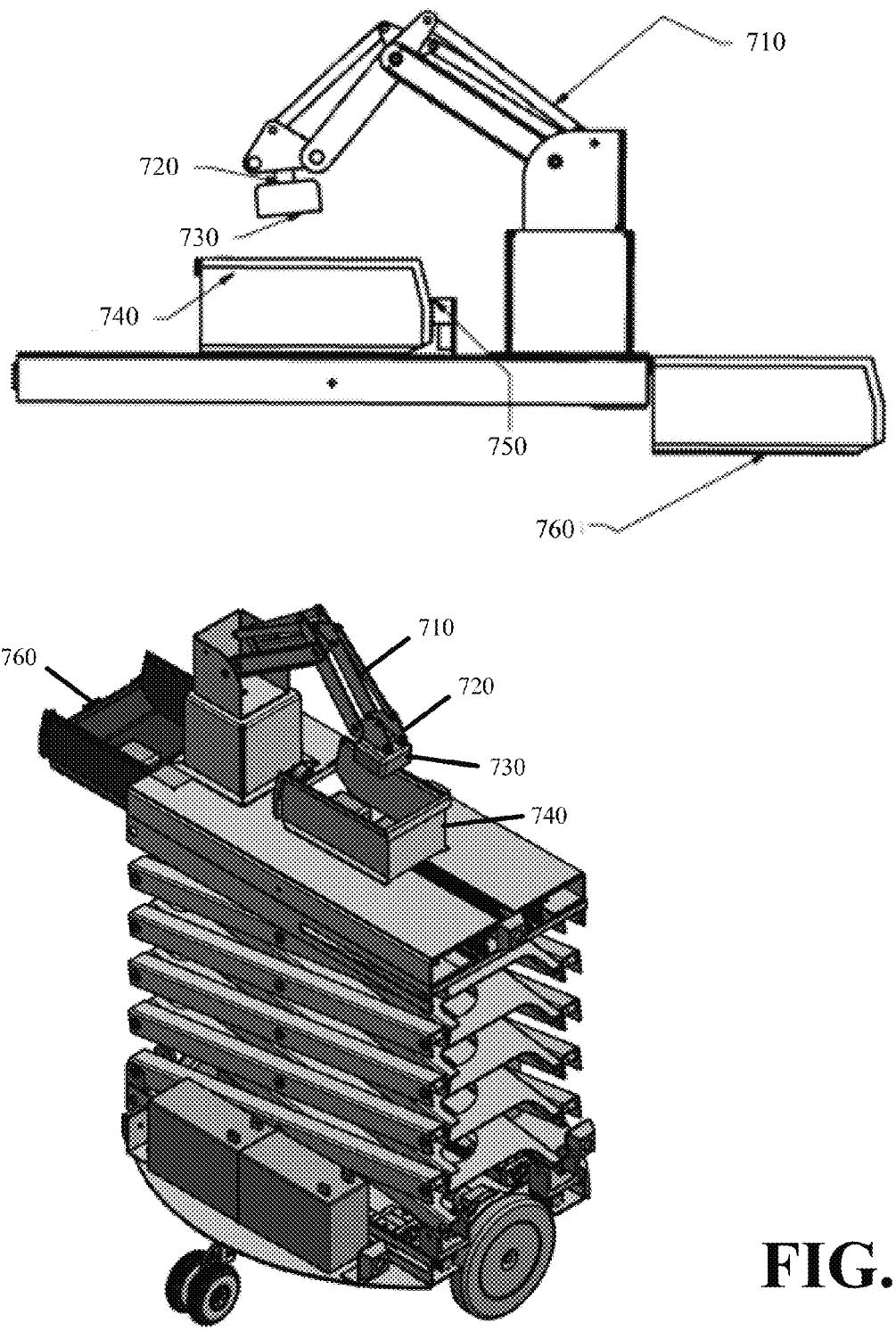
FIG. 7 illustrates an adapted robot retriever in accordance with some embodiments.

FIG. 5 is one bin embodiment from which the robots can dispense items and fulfill orders in an automated manner. However, bins with other dispensing means can also be used in conjunction with the robots of some embodiments. In some embodiments, the bins interacted with by the robots are nothing more than a receptacle with a cavity holding different quantities of an item. These bins may have no dispensing means whatsoever. In some such embodiments, the robots themselves, and more specifically, the robot retrievers can be adapted to couple to and dispense items using other dispensing means. FIG. 7 illustrates one such adapted retriever in accordance with some embodiments.

In FIG. 7, the retriever uses a crane 710 with a retractable claw or suction grip 720 to extract an item 730 from bin 740 retrieved using the electromagnet 750. The crane 710 then rotates to dispense an extracted item 730 into the item deposit bin 760. As such, the robot structures and bin structures presented in FIGS. 2-7 illustrate preferred embodiments of the autonomous system. However, one of ordinary skill in the art will appreciate that different such structures can be used to implement the autonomous functionality described below.

Different bin and robot embodiments are also envisioned for handling items of differing sizes. For instance, bins of a smaller first size can be used to store small items, such as batteries, and bins of a larger second size can be used to store large items, such as televisions. In such instances, different sized robots can be used to retrieve the small items than those used to retrieve the large items.

II. Autonomous Order Fulfillment

Figure 8:
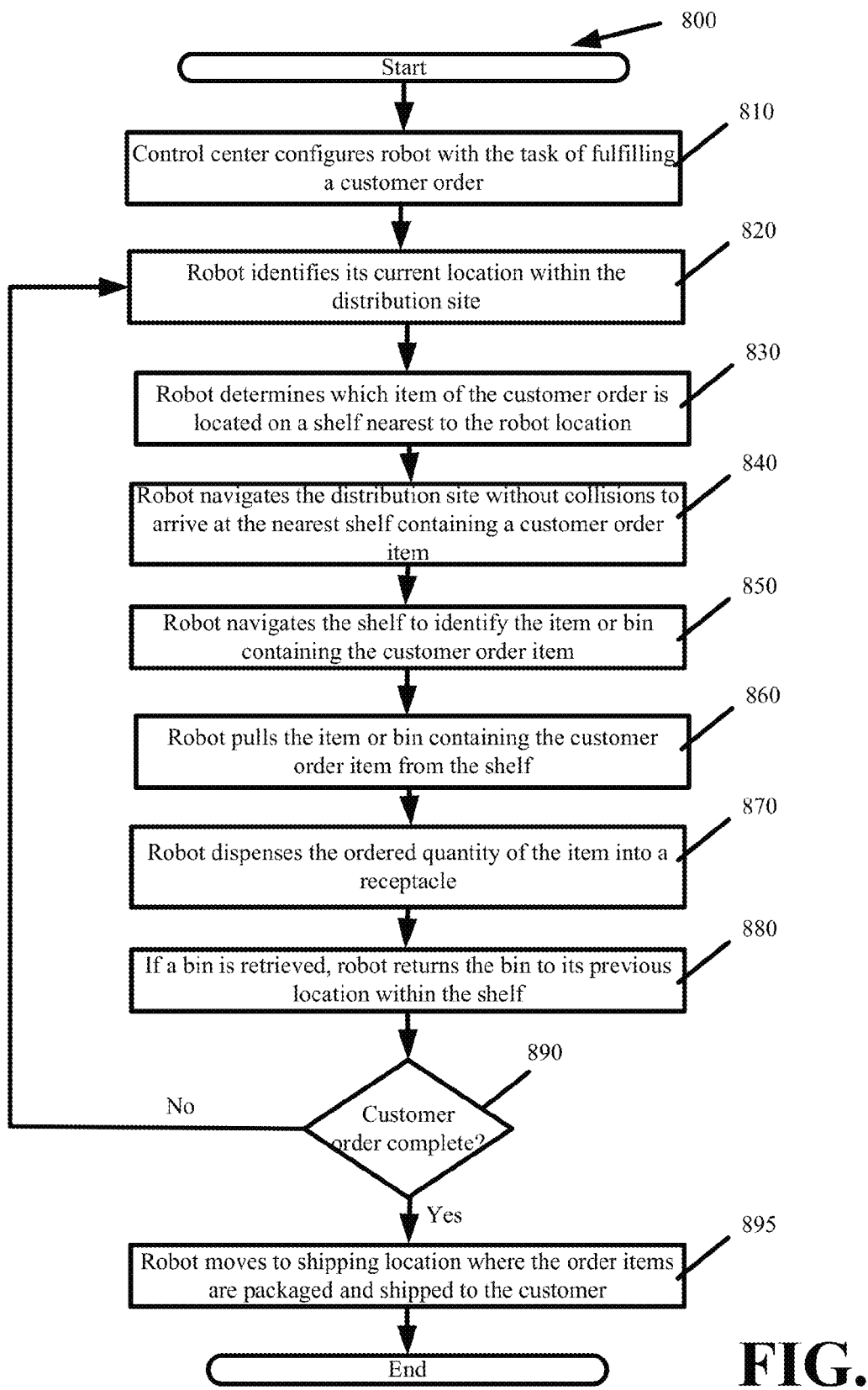
FIG. 8 presents a process with which a robot of some embodiments autonomously fulfills a customer order using its ability to move along the x, y, and z spatial planes.

FIG. 8 presents a process 800 with which a robot of some embodiments autonomously fulfills a customer order using its ability to move along the x, y, and z spatial planes. The process 800 commences when the control center configures (at 810) the robot a customer order that the robot is to fulfill autonomously. Configuring the robot comprises uploading to the robot, a customer order including identifiers identifying each of the items that make up the customer order.

For optimal efficiency, the robot identifies (at 820) its current location within the distribution site upon receiving the customer order from the control center. In some embodiments, the robot uses its sensors, specifically cameras, to obtain a nearest identifier that is affixed to either the distribution site floor or the nearest shelf to where the robot is currently located. The robot references a digital map of the distribution site to identify a position of the nearest identifier in the distribution site, and thereby determine the robot's own position. From the map, the robot also determines (at 830) which item of the customer order is located on a shelf nearest to the robot location.

The robot navigates (at 840) intelligently through the distribution site without collisions to arrive at the nearest shelf containing a customer order item. The robot then navigates (at 850) the shelf itself to identify the bin containing the customer order item. To do so, the robot rises along the z-axial plane scanning identifiers affixed to the bins to identify the bin containing the customer order item.

The robot pulls (at 860) the bin containing the customer order item from the shelf using any of the aforementioned robot functionality. The robot dispenses (at 870) the ordered quantity of the item from the bin into the robot's item deposit bin. If a bin was retrieved, the robot returns (at 880) the bin to its previous location within the shelf.

Next, the robot determines (at 890) whether the customer order is complete as a result of dispensing the last item. If not, the robot reverts to step 820 before setting out to retrieve the next closest remaining item in the customer order.

Otherwise, the robot has fulfilled the order and the robot moves (at 895) to a shipping location where the order items are packaged and shipped to the customer.

In some embodiments, multiple robots work together to complete a particular customer order. In some embodiments, a first set of robots are tasked with retrieving bins from the shelves and dispensing correct item quantities from the bins. A second set of robots are then tasked with collecting the items from the first set of robots in order to fulfill customer order autonomously or to deliver the items of a customer order for fulfillment. In this configuration, the first set of robots perform the task of or item bin retrieval and item dispensing while the second set of robots aggregate items of a customer order to a common location and ready the customer order for packaging or shipment. Each robot of the first set of robots can be configured to perform retrieval from one or more specific shelves. This saves the first set of robots from navigating unnecessarily within the distribution site. The first set of robot can thereby focus entirely on item or bin retrieval.

In some embodiments, the first set of robots deposit any retrieved items in containers located nearby the shelves the robots are assigned to. The second set of robots then periodically stop by to pick up the container or retrieve items from the container as part of fulfilling individual customer orders.

In some other embodiments, the first set of robots deposit retrieved items directly with the second set of robots. In this mode of operation, a second set robot conveys the customer order that it is to fulfill to the first set of robots. The first set of robots then go about retrieving the items from their corresponding shelves with the second set robot making stops at each of the first set of robots to directly receive the items retrieved by those first set of robots. The second set robot can therefore fulfill an order without waiting for the individual items to be retrieved. Instead, it merely navigates between the first set of robots which will have the order items ready to deposit once the second set robot arrives.

In some other embodiments, two or more robots are tasked with retrieving bins or items for different parts of the customer order. In some such embodiments, the two or more robots operating in collaboration on a customer order simultaneously traverse the distribution site in order to retrieve different bins containing different items of the customer order. The collaborating robots dispense items of the customer order into their respective item deposit bins. The collaborating robots then unload the items they retrieved at a specific smarttable where the entire customer order is then compiled into one container or package. Alternatively, the two or more robots operating in collaboration on a customer order can deliver the bins containing the customer order items to the smarttable.

The smarttable contains sensors to detect the items or bins that have been delivered by the robots. In some embodiments, using cameras and robotic arms, the smarttable then compiles the customer order from the items or bins delivered by different robots into a single package.

In some other embodiments, the smarttable facilitates the ability of a human worker to compile the delivered items into a single package. In some such embodiments, the smarttable contains a display presenting the items of a customer display to the human worker. The smarttable further contains illuminated buttons or lights. These buttons or lights identify on the smarttable surface where robots have deposited different items or bins containing items of the customer order. The human worker then fulfills the order by following the guidance provided by the smarttable. Using cameras or other sensors, the smarttable can then verify that the human worker has correctly fulfilled a customer order with the correct items and correct quantity of items.

The control center instructs each and every robot operating within the distribution site of which orders or order items the robots are to retrieve. The control center wirelessly sends different customer orders to the robots operating in the distribution site floor. If a robot is already processing one customer order, the robot queues any additional customer orders from the control center until the current customer order has been fulfilled. The control center can send an entire customer order to one robot or split the items of the customer robot across two or more robots so that the robots perform a distributed fulfillment of the customer order.

In some embodiments, the control center translates order items from a specific customer order to their respective bin identifiers, UPC codes, other unique item identifiers, or item features from which the robots can identify those items in the distribution site. A quantity can be provided for each item when two or more of the same item is purchased. The order is then passed from the control center to one or more robots for fulfillment.

In some embodiments, the robot retrieves the items associated with a customer order in a most efficient manner. Rather than retrieve each item in the order provided by the control center, the robot receiving the customer order first determines its present location within the distribution site. Next, the robot scans through the items received as part of the customer order and determines the most efficient order to retrieve the items based on the robot's current location.

Figure 9:
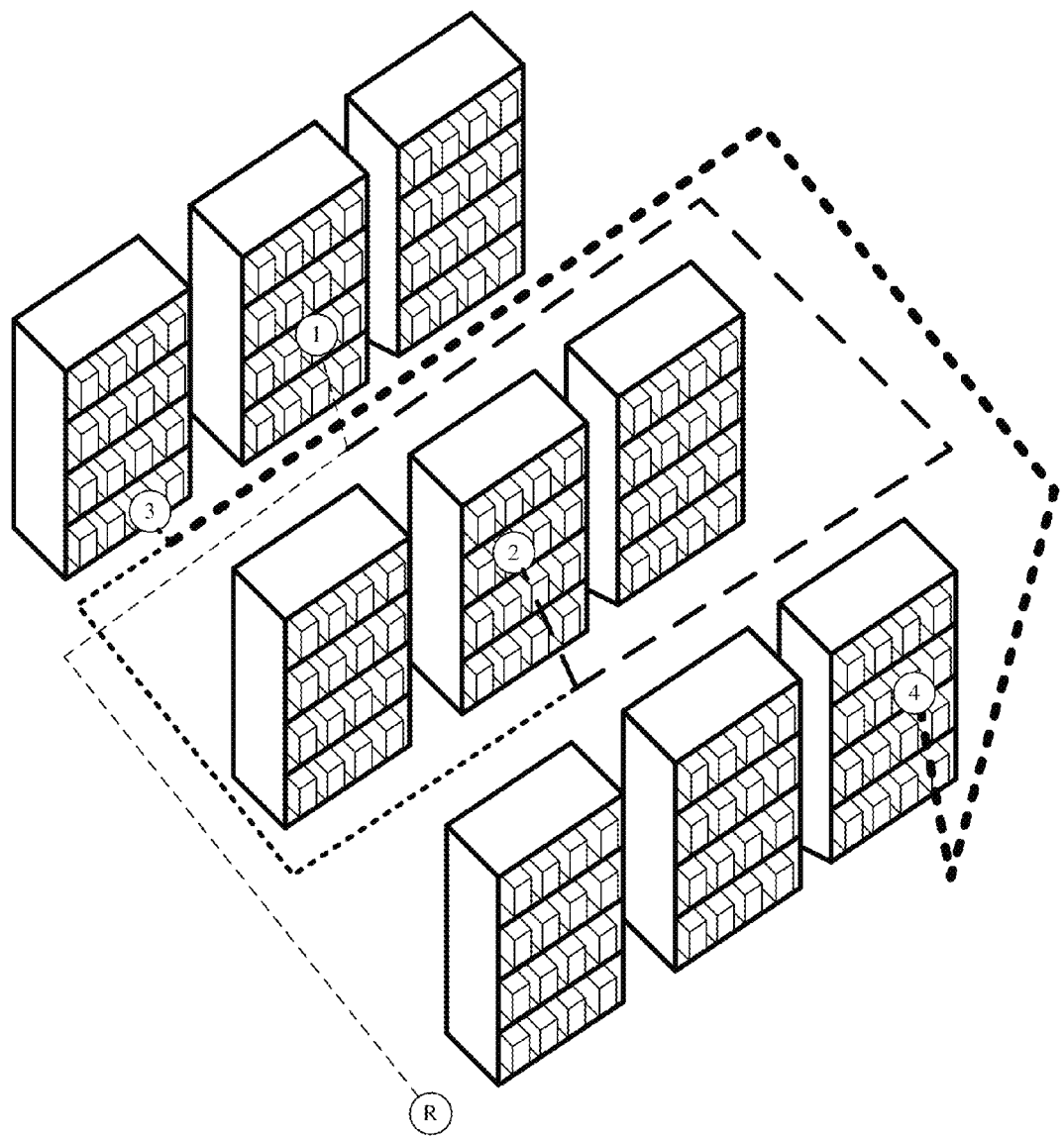
FIG. 9 illustrates an inefficient retrieval of customer order items when the robot simply retrieves the items in the order in which they were received from the control center.
Figure 10:
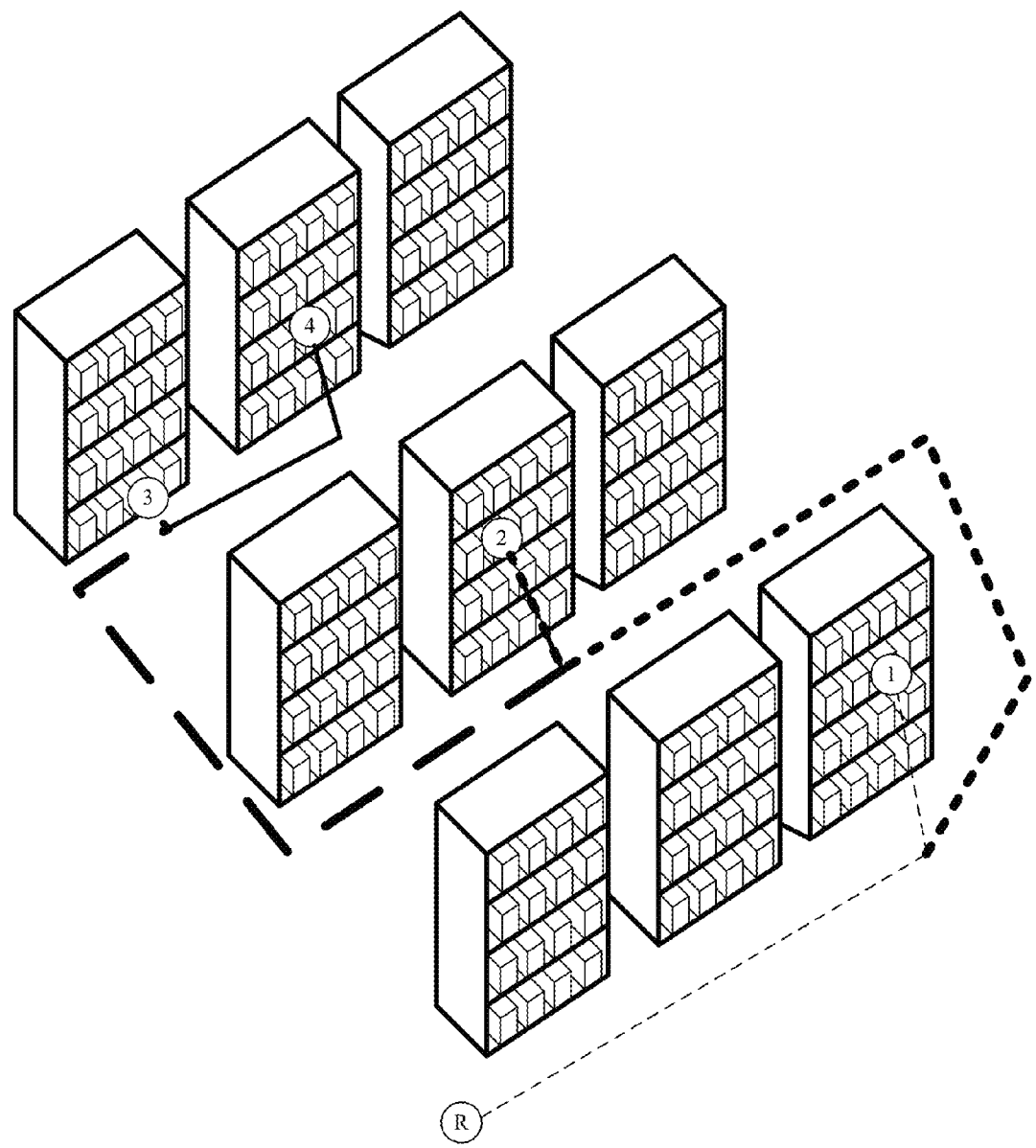
FIG. 10 illustrates the efficient retrieval of customer order items when the robot preprocesses the customer order in accordance with some embodiments to determine the position of the customer order items in relation to its own position prior to setting out to retrieve the items.

FIG. 9 illustrates an inefficient retrieval of customer order items when the robot simply retrieves the items in the order in which they were received from the control center. FIG. 10 illustrates the efficient retrieval of customer order items when the robot preprocesses the customer order in accordance with some embodiments to determine the position of the customer order items in relation to its own position prior to setting out to retrieve the items.

III. Navigation

In some embodiments, the robot navigates across the distribution site shelves using a first set of unique shelf identifiers. A shelf identifier from the first set of unique shelf identifiers is affixed to each shelf of the distribution site in a location that is readily and visibly accessible for the robot. In some embodiments, the first set of unique shelf identifiers includes a set of QR codes, bar codes, or RFID tags. However, it should be apparent that the first set of unique shelf identifiers can include any unique set of visual identifiers that include graphics, symbols, or alphanumeric characters. In some embodiments, the first set of unique shelf identifiers can alternatively or additionally be affixed to the distribution site floor in front of the shelves that they identify.

The robot orients itself using the first set of shelf identifiers and a map of the distribution site generated from the first set of shelf identifiers. The cameras about the robot's motorized base can scan the first set of shelf identifiers from a distance of several meters depending on the size of the identifiers and robot camera resolution.

Figure 11:
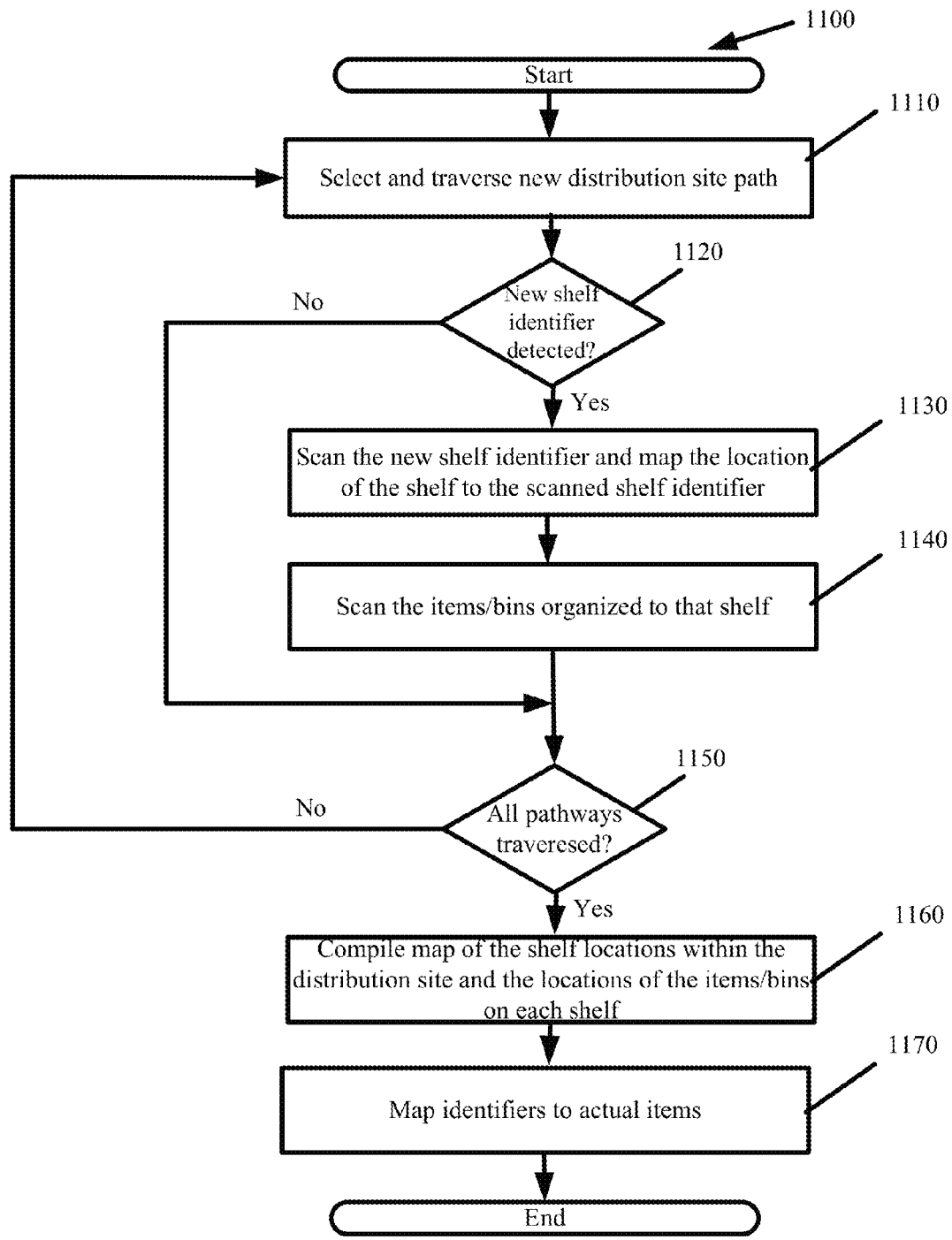
FIG. 11 presents a process by which a robot autonomously maps a distribution site in accordance with some embodiments.

FIG. 11 presents a process 1100 by which a robot autonomously maps a distribution site in accordance with some embodiments. To generate the map of the distribution site, the robot performs a shelf discovery routine. As part of the shelf discovery routine, the robot traverses (at 1110) each pathway of the distribution site. The robot can use local or global positioning system (GPS) coordinates to ensure it covers all distribution site pathways. In some embodiments, the control center uploads a map of the distribution site pathways to the robot.

While traversing each pathway, the robot stops (at 1120) at each new shelf it encounters. The robot encounters a shelf when the cameras of the robot's sensory array detect a new shelf identifier. The robot scans (at 1130) the new shelf identifier and maps the location of the shelf to the scanned shelf identifier. The robot determines the location of the shelf by positioning itself in front or adjacent to the shelf and recording GPS coordinates at that position.

At each encountered shelf, the robot also performs an item/bin discovery routine. In performing the item/bin discovery routine, the robot scans (at 1140) each and every unique item/bin organized to that shelf. In some embodiments, the robot scans a unique bin identifier from a second set of unique bin identifiers affixed to each bin. The second set of unique bin identifiers can also be in the form of QR codes, bar codes, or other graphical, symbolic, or alphanumeric codes. In embodiments where items are directly placed on the shelves, the robot scans for UPC codes, serial numbers, or unique features of the item.

Figure 12:
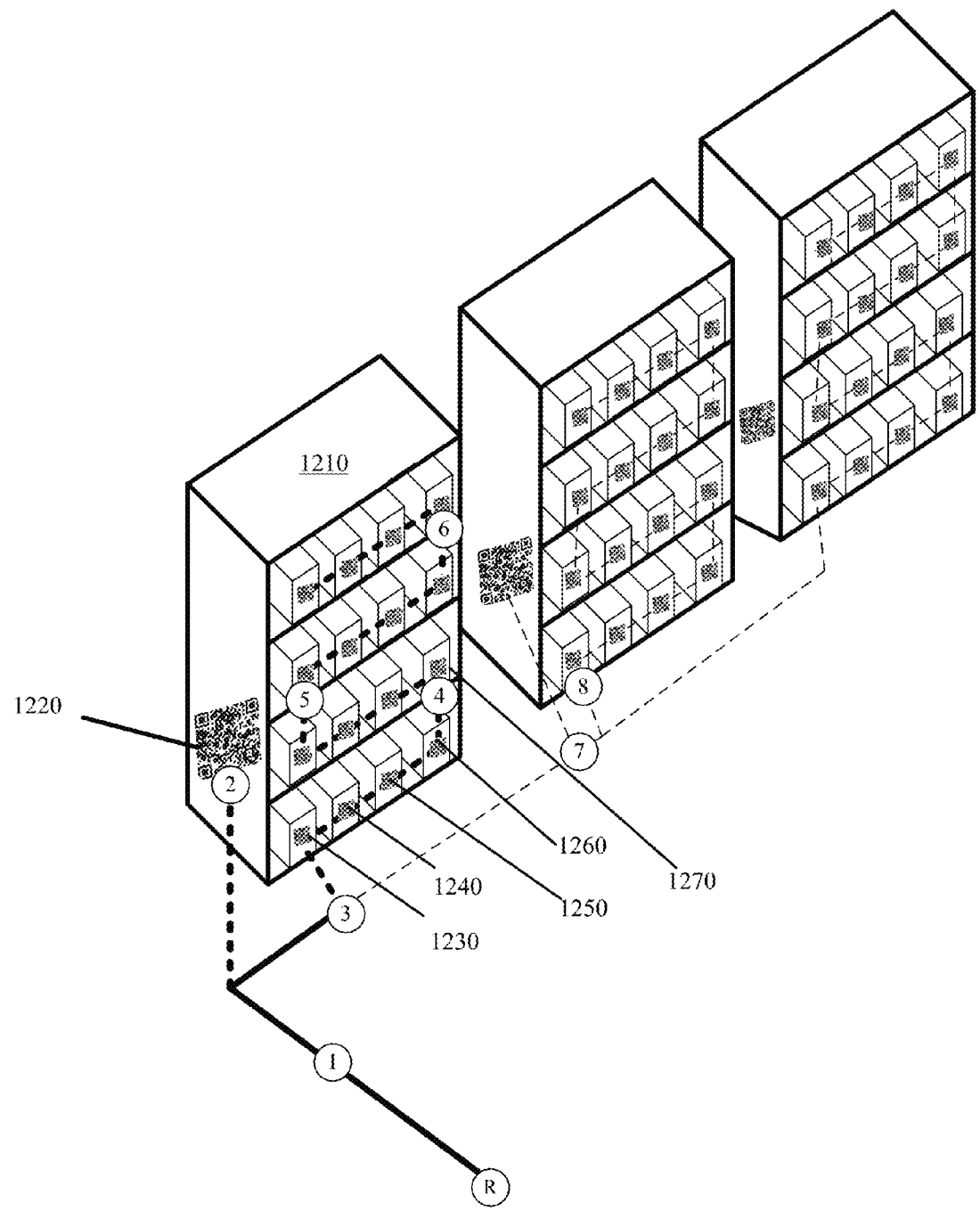
FIG. 12 conceptually illustrates the bin discovery routine performed by a robot of some embodiments.

FIG. 12 conceptually illustrates the bin discovery routine performed by a robot of some embodiments. As shown, the robot stops at a shelf 1210 when it identifies a new shelf identifier 1220 along its shelf discovery routine. The robot proceeds to the edge of the shelf 1210 and rises along the z-axial plane until it is at the level of the first shelf ledge or row. The robot then moves sideways along the x-axial plane to discover the item/bin identifiers 1230, 1240, 1250, and 1260 organized to that ledge or row. When the robot reaches the end of the ledge or row, it rises again along the z-axial plane to the next ledge or row 1270 before moving in the opposite direction along the x-axial plane until it is back to the starting edge of the shelf. The robot continues scanning in this manner until the unique items/bins on all ledges or rows of the shelf are scanned. As a result of the bin discovery routine, the robot identifies which items or bins are accessible at which shelf identifier. A more granular discovery can map the items/bins to specific locations about the shelf.

The robot determines (at 1150) whether the distribution site is fully mapped. If not, the process 1100 continues in the above fashion until the location of each shelf within the distribution site is identified and the bins accessible at each shelf are also identified.

The locations of the items/bins and shelves as determined from scanning the first set of shelf identifiers and the second set of item/bin identifiers are then compiled (at 1160) into a map of the distribution site. To know what is inside each bin, the control center creates an item-to-bin identifier mapping. The identifier-to-bin mapping is then combined (at 1170) with the robot generated map of the distribution site such that the robot is able to ascertain the location of each and every item within the distribution site.

As noted above, by scanning the closest shelf identifier and by referencing the generated map, the robot can at any time determine its location within the distribution site and can intelligently, efficiently, and autonomously plot its course to a different location within the distribution site. Moreover, using the map, the robot is able to determine its location relative to each and every item within the distribution site. As a result, the robot can efficiently fulfill a customer order by determining the shortest path and optimal order with which to retrieve each item of the customer order.

In some embodiments, the robot also populates the map with various obstacles that the robot encounters during its discovery. The inclusion of the obstacles within the map allows the robot to preemptively avoid such obstacles during subsequent traversals of the distribution site.

In some embodiments, the robot builds the map by performing the shelf discovery routine and bin discovery routine during off-hours or periodically when the layout of the distribution site changes. The map created by one robot can be shared with other robots operating in the same distribution site. In some such embodiments, the robot uploads its map to the control center which then incorporates the item-to-bin mapping information to the map before distributing the complete mapping to each of the distribution site robots. Accordingly, one robot can be removed from order fulfillment tasks to map or remap the distribution site while other robots continue their order fulfillment tasks. Once the robot has completed mapping the distribution site, it updates its own map and can optionally update the maps used by other robots by uploading the mapping to them.

Radio frequency broadcasting beacons can provide an alternative means with which the robots navigate within the distribution site. In some such embodiments, the beacons are strategically placed around the distribution site and a map of the distribution site with each beacon location is generated. Compatible receivers are fitted on the robots. Using the receivers, the robots can detect radio signal time of flight between the beacons and determine their location within the distribution site based on the detected signals. The robots can distinguish individual shelves when the beacons are assigned to the shelves. Alternatively, the robots can use the beacons to navigate the distribution site and then rely on the robot cameras to identify target shelves.

In some embodiments, the robots include LIDAR systems for navigating within the distribution site. The robots can localize their position within a map of the distribution site by matching laser scans performed by the LIDAR system to a known map. Moreover, the LIDAR system can assist the robot in avoiding collisions while traversing within the distribution site.

IV. Inventory Management

To further automation and seamless order fulfillment, the robots of some embodiments provide additional utility by way of automating inventory management. Inventory management involves ensuring a sufficient quantity of items is in stock. From this stock, customer orders can be fulfilled. If however, the stock falls below the demand, customer orders cannot be fulfilled and orders will be delayed. Accordingly, inventory management is a logistical problem in which the items exiting the distribution site must be equal to or less than the items coming into the distribution site.

The robots automate inventory management by using the set of load cells on the retriever to inspect quantities in stock when going about fulfilling orders. When a robot retrieves a bin from a shelf, the robot can identify the quantity of remaining items in the bin by measuring the weight of the bin and dividing the total weight by the per unit weight of the items in the bin. The robots can then provide the item quantities to the control center such that the control center has a holistic and real-time view of the entire distribution site inventory.

When inventory for a specific item is low, the control center can automatically order additional units from the appropriate supplier. The control center can use static or dynamic low inventory thresholds to order additional units of an item from a correct supplier. A static inventory threshold triggers whenever inventory quantity for a specific item falls below a fixed number. A dynamic inventory threshold tracks a rate at which item quantity decreases over time and sets a threshold accordingly. Specifically, whenever a robot dispenses any item from a bin as part of fulfilling a customer order, the robot notifies the control center that the item has been dispensed and that there is one less unit of that item in inventory. The control center tracks the rate at which the different items are being dispensed by the robots. Based on the rates, the control center can differentiate popular items from less popular items and replenish the popular items sooner than the less popular items because the inventory for the popular items is reducing faster than the inventory of the less popular items.

The robots can also be used to restock shelves once additional units of an item are received from a supplier. To restock shelves, the robots essentially perform an inverse order fulfillment operation. The inverse operation involves the control center instructing one or more robots of an item to restock. The instructions include an identifier identifying a location of the items awaiting restocking. This identifier can identify a docking bay or sorting area within the distribution site where suppliers unload items for restocking. The instructions from the control center can further include a second identifier identifying the final position for the items in the distribution site. This second identifier can identify a specific shelf within the distribution site or, more granularly, a specific location within a specific shelf.

The robots then navigate to the first identifier identifying the current location of the items to be restocked. Using the set of cameras, each robot positions its retriever in front of an item. This includes raising or lowering the extendible lift to align the retriever with the next accessible item in a pile of items. The robot activates its pull motor to engage the next accessible item with the suction assembly. Once the suction assembly engages the item, the pull motor reverses causing the item to be withdrawn from its original position. The robot then carries the item to its final position within the distribution site. Specifically, the robot references its map of the distribution site shelves in order to determine the optimal path to the shelf where the retrieved item is to be restocked. The robot navigates to the appropriate distribution site shelf. The robot raises or lowers its extendible lift to properly position the item within the shelf before depositing the item onto the shelf by activating the pull motor and disengaging the suction assembly once the item is inserted onto the shelf.

As a variant to shelf restocking, in some embodiments, the control center leverages the real-time inventory information as well as the robots to optimize the distribution size in order increase order fulfillment efficiency. Specifically, the real-time inventory information reported by the robots is used to reorganize the shelves and/or bins within the distribution site so that frequently retrieved items or items that are purchased together are physically located close to one another. This then reduces the total distance the robots have to travel in fulfilling orders, thereby shortening the average time to fulfill each order.

Figure 13:
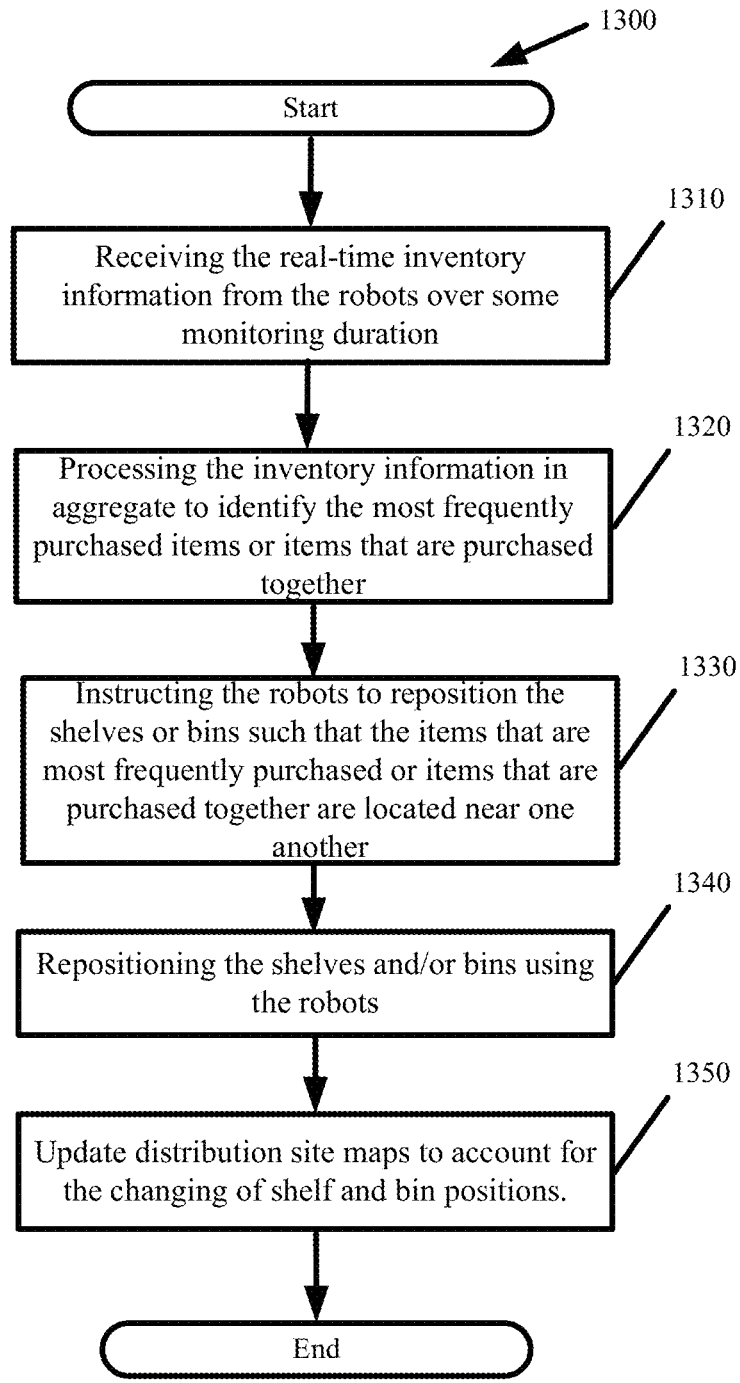
FIG. 13 presents a process for autonomously optimizing distribution site efficiency in accordance with some embodiments.

FIG. 13 presents a process 1300 for autonomously optimizing distribution site efficiency in accordance with some embodiments. The process 1300 commences with the control center receiving (at 1310) the real-time inventory information from the robots over some monitoring duration. The monitoring duration can be a period of one day, one week, one month, etc.

The process then involves the control center processing (at 1320) the inventory information in aggregate to identify the most frequently purchased items or items that are purchased together. During off-hours or non-peak hours, the control center then instructs (at 1330) the robots to reposition the shelves or bins such that the items that are most frequently purchased or items that are purchased together are located near one another. As part of the repositioning, the robots can also position the shelves or bins closer to the robots' starting positions within the distribution site.

The robots reposition (at 1340) the shelves and/or bins as instructed. In doing so, the robots also update (at 1350) their distribution site maps to account for the changing of shelf and bin positions. Thereafter, when the control center provides one of the robots with a customer order to fulfill, the robot will use the updated map to identify the customer order item locations.

In some embodiments, the robots can be used to perform the related but similar task of defragmenting the distribution site. Distribution site defragmentation involves maximizing the shelf space by locating the maximum number of bins on each shelf. As an example, a distribution site may have a shelf with rows 10 feet in width and bins that are 3 feet wide, 5 feet wide, and 7 feet wide. In this scenario, the most efficient utilization of the shelf space and defragmentation involves collocating a 3 feet wide bin with a 7 feet wide bin and collocating a 5 feet wide bin with another 5 feet wide bin, rather than collocating a 3 feet wide bin with a 5 feet wide bin. To perform defragmentation, the control center identifies the space on each shelf, identifies the size of each bin, and determines a most efficient allocation of the bins to the shelf space. The control center then directs the robots to reposition the bins according to the optimal defragmented positioning.

In some embodiments, defragmenting also involves eliminating wasted space by moving bins from far away shelves to closer shelves that have empty space. In some embodiments, defragmenting also involves removing empty bins from shelves to open space for other items that are in stock.

V. Computer System

Some of the above-described processes, engines, modules, and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 14:
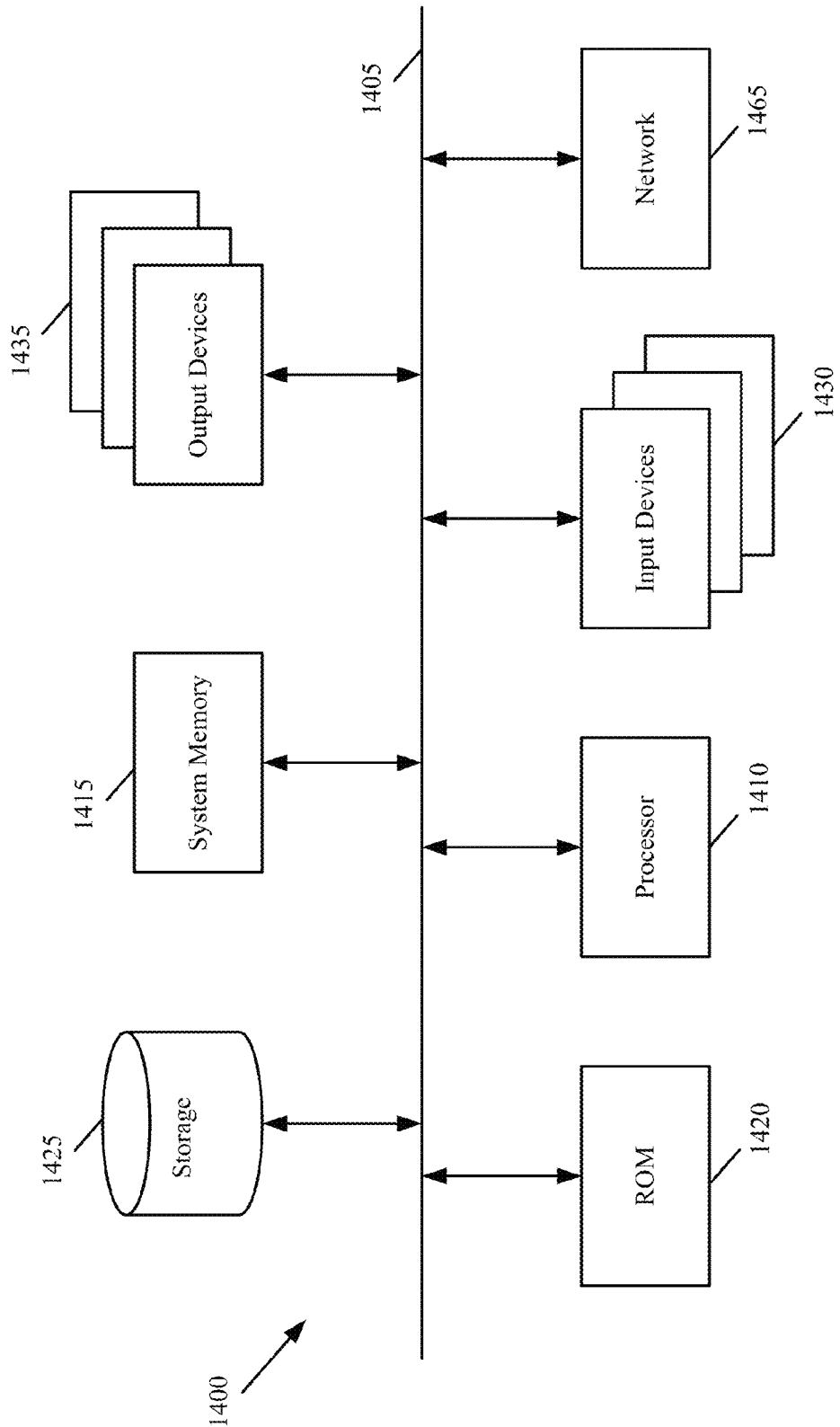
FIG. 14 illustrates a computer system included as part of the control center or robots of some embodiments.

FIG. 14 illustrates a computer system included as part of the control center or robots of some embodiments. Such a computer system includes various types of computer-readable mediums and interfaces for various other types of computer-readable mediums that implement the various methods and machines of the monitoring system described above. Computer system 1400 includes a bus 1405, a processor 1410, a system memory 1415, a read-only memory 1420, a permanent storage device 1425, input devices 1430, and output devices 1435.

The bus 1405 collectively represents all system, peripheral, and chipset buses that communicatively connect the numerous internal devices of the computer system 1400. For instance, the bus 1405 communicatively connects the processor 1410 with the read-only memory 1420, the system memory 1415, and the permanent storage device 1425. From these various memory units, the processor 1410 retrieves instructions to execute and data to process in order to execute the processes of the embodiments described above. The processor 1410 is a processing device such as a central processing unit, integrated circuit, graphical processing unit, etc.

The read-only-memory (ROM) 1420 stores static data and instructions that are needed by the processor 1410 and other modules of the computer system. The permanent storage device 1425, on the other hand, is a read-and-write memory device. This device is a non-volatile memory unit that stores instructions and data even when the computer system 1400 is off. Some embodiments use a mass-storage device (such as a magnetic, solid-state disk, or optical disk and its corresponding disk drive) as the permanent storage device 1425.

Other embodiments use a removable storage device (such as a flash drive or solid-state disk) as the permanent storage device. Like the permanent storage device 1425, the system memory 1415 is a read-and-write memory device. However, unlike storage device 1425, the system memory is a volatile read-and-write memory, such as random access memory (RAM). The system memory stores some of the instructions and data that the processor needs at runtime. In some embodiments, the processes are stored in the system memory 1415, the permanent storage device 1425, and/or the read-only memory 1420.

The bus 1405 also connects to the input and output devices 1430 and 1435. The input devices enable the user to communicate information and select commands to the computer system. The input devices 1430 include alphanumeric keypads (including physical keyboards and touchscreen keyboards), pointing devices (also called "cursor control devices"). The input devices 1430 also include audio input devices (e.g., microphones, MIDI musical instruments, etc.). The output devices 1435 display images generated by the computer system. The output devices include printers and display devices, such as liquid crystal displays (LCD).

Finally, as shown in FIG. 14, bus 1405 also couples computer 1400 to a network 1465 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 1400 may include one or more of a variety of different computer-readable media. Some examples of such computer-readable media include RAM, ROM, compact discs (CD-ROM), digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, and any other optical or magnetic media.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. An autonomous order fulfillment system comprising:
   a first robot comprising a motorized based and a container; and
   a second robot comprising (i) a motorized base, (ii) a lift coupled to the base rising to any of a plurality of heights above said base, and (iii) a retriever comprising a platform atop said lift and a retrieval arm, wherein the first and second robots cooperatively fulfill a customer order for a particular item with the first and second robots navigating about a plurality of shelves containing a plurality of items to a particular shelf containing the particular item, with the second robot raising said lift to align said platform to a height of the particular item about the particular shelf, retrieving the particular item from the particular shelf using the retrieval arm, and dispensing the particular item to the first robot container, and with the first robot delivering the particular item in the container to a packaging site.

2. The autonomous order fulfillment system of claim 1, wherein the second robot platform comprises a scale verifying retrieval of a correct item from the particular shelf by measuring a weight of the particular item and comparing said weight to a defined weight for the correct item.

3. The autonomous order fulfillment system of claim 2, wherein the second robot rejects the particular item and retrieves another item from the particular shelf when the weight of the particular item does not match to the defined weight for the correct item.

4. The autonomous order fulfillment system of claim 2, wherein the second robot determines a quantity of a particular good contained within the particular item by measuring the weight of the particular item relative to a weight of the particular good contained within the particular item.

5. The autonomous order fulfillment system of claim 4, wherein determining the quantity of the particular good comprises dividing the particular item weight by the per unit weight of the particular good.

6. The autonomous order fulfillment system of claim 1 further comprising a plurality of radio frequency beacons transmitting radio signals, and wherein the first and second robots navigate about the plurality of shelves to the particular shelf based on phase or time of flight signals transmitted from the plurality of radio frequency beacons.

7. The autonomous order fulfillment system of claim 1 further comprising a plurality of unique identifiers with a different unique identifier of the plurality of unique identifiers attached to a different shelf of the plurality of shelves, wherein the first and second robots navigate about the plurality of shelves to the particular shelf based on the plurality of unique identifies.

8. A method comprising:
monitoring at a warehouse control center, a rate at which customers order a particular item;
retrieving a container containing a plurality of the particular item from a storage shelf using a robot operating within said warehouse;
determining a remaining quantity of the particular item contained within said container using sensors of said robot;
reporting said remaining quantity from the robot to the control center; and
generating at the control center, an order for an additional quantity of the particular item according to said remaining quantity and the rate at which customers order the particular item.

9. The method of claim 8, wherein determining the remaining quantity comprises weighing the container using a weight scale of the robot and dividing the container weight by a per unit weight of the particular item.

10. The method of claim 8, wherein generating the order comprises increasing said order quantity of the particular item when the remaining quantity and the rate at which customers order the particular item reaches a defined threshold.

11. The method of claim 8 further comprising increasing the quantity of the particular item purchased as part of said order when the rate at which customers order the particular item is greater than a threshold and decreasing the quantity of the particular item purchased as part of said order when the rate at which customers order the particular item is less than the threshold.

12. The method of claim 8 further comprising classifying the particular item as a popular item based on said rate and ordering said robot to relocate the container from said shelf to a different shelf containing popular items.

13. An autonomous order fulfillment system comprising:
a first robot comprising a motorized base and a container, the first robot collecting items of a customer order in said container and delivering said items to one of a plurality of packaging stations in a distribution center;
a second robot comprising (i) a base with wheels, at least a first motor driving the wheels, and batteries powering said first motor, (ii) an extendible lift coupled to the base, the extendible lift rising to any of a plurality of heights above said base, and (iii) a robotic arm with a picker atop said extendible lift, wherein the robotic arm moves the picker about a three dimensional space to a position of a particular item of the customer order about a storage shelf with the picker grasping the particular item and the robotic arm repositioning the picker for dispensing of the particular item in the first robot container.

14. The autonomous order fulfillment system of claim 13 further comprising at least a third robot comprising a base with wheels, an extendible lift, and a robotic arm with a picker, wherein the robotic arm of the third robot moves the picker about a three dimensional space to a position of a different second item of the customer order about a different second storage shelf with the picker grasping said second item and the robotic arm repositioning the picker for dispensing of said second item in the first robot container.

15. The autonomous order fulfillment system of claim 14, wherein the first robot is configured to collect the particular item of the customer order from the second robot by navigating to a position adjacent the second robot and is further configured to collect the second item of the customer order from the third robot by navigating to a position adjacent the third robot.

16. The autonomous order fulfillment system of claim 15 further comprising a control center instructing (i) the second robot in retrieving the particular item of the customer order from said shelf, (ii) the third robot in retrieving the second item of the customer order from said second shelf, and (iii) the first robot to the position adjacent the second robot in collecting the particular item and to the position adjacent the third robot in collecting the second item.

17. The autonomous order fulfillment system of claim 13 further comprising at least a third robot comprising a motorized base and a container, the third robot collecting different items of the same or different customer order from the second robot subsequent to the first robot receiving the particular item from the second robot.

* * * * *